United States Patent Office.

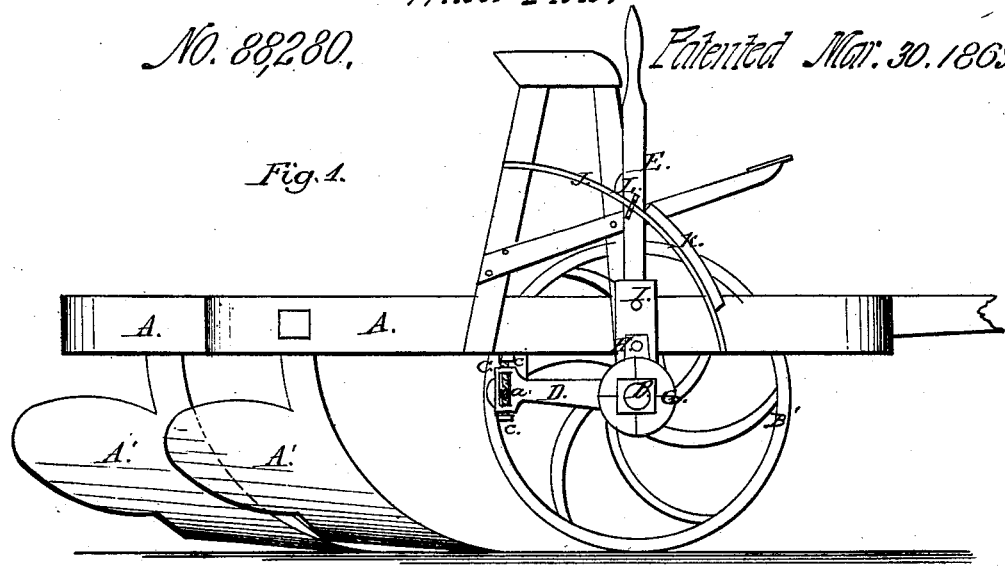
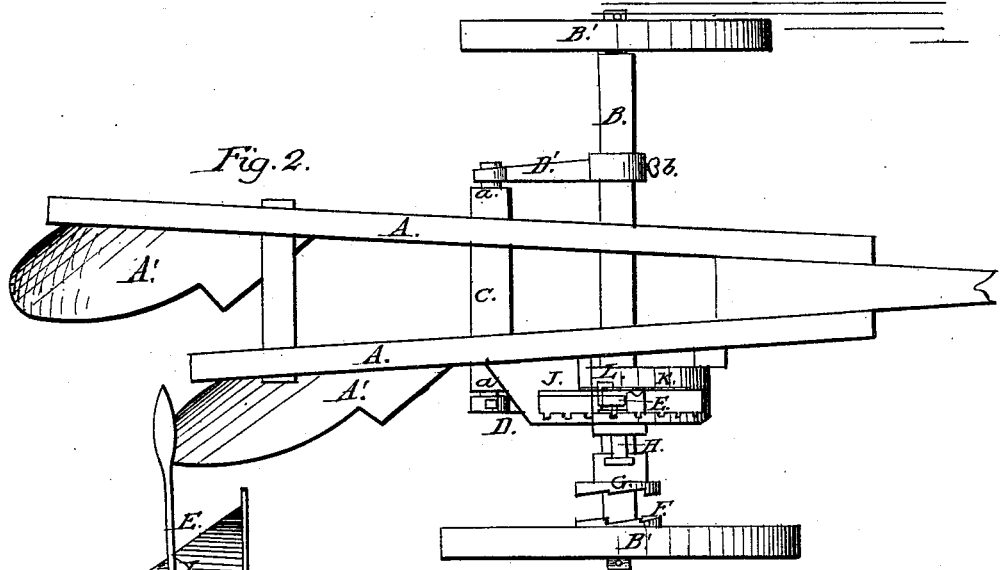
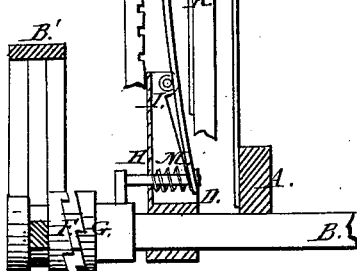

ARTEMAS DAVISON, OF SAN LEANDRO, CALIFORNIA.

Letters Patent No. 88,280, dated March 30, 1869; antedated February 20, 1869.

---

IMPROVEMENT IN GANG-PLOWS.

---

The Schedule referred to in these Letters Patent and making part of the same.

---

*To all whom it may concern:*

Be it known that I, ARTEMAS DAVISON, of San Leandro, county of Alameda, State of California, have invented an Improved Gang-Plow; and I do hereby declare the following description and accompanying drawings are sufficient to enable any person skilled in the art or science to which it most nearly appertains, to make and use my said invention or improvements without further invention or experiment.

The object of my invention is to provide a gang-plow, so constructed that the plows can be raised out of the ground by means of the same power which propels the plow, thus saving the driver much hard labor, especially where a gang of several plows is used.

It consists of two clutches, one movable and the other fixed, the fixed clutch being arranged around the axle, while the revolving clutch is formed on the hub of the wheel.

The frame is connected with the axle by means of arms, which are attached to it in such a manner that by turning the axle the frame is raised.

The sliding clutch on the axle is operated by a hand or foot-lever, by which it can be moved, so as to engage with the revolving clutch on the hub of the wheel, and cause it to turn the axle, and thus elevate the plows out of the ground by means of the previously-described arms.

To more fully illustrate and explain my invention, reference is had to the accompanying drawings, forming a part of this specification, of which—

Figure 1 is a side elevation, with one wheel removed.
Figure 2 is a plan, with seat removed.
Figure 3 is an enlarged view of the clutch and lever.

Similar letters of reference indicate like parts in each of the figures.

A represents a strong frame, to which the plows A' are attached, and

B, the axle of the bearing-wheels B'.

Near the centre of the frame is a bar, C, extending across it, having its end formed into axes $a\ a'$.

Arms D D' have one end formed so as to fit around the axle B, as shown, where they are secured at the desired position by means of set-screws $b$. The opposite ends of these arms receive the axes $a\ a'$, and by that means support the frame and plows.

The operating-lever E is attached to the arm D where it connects with the axle B, so that when thrown forward, it turns the axle, and elevates the frame and plows by means of the arms D D'. The lever E is ordinarily operated by the hand or foot of the driver, and, as the weight of the frame and plows is great, it is a laborious method.

To obviate this, I form a clutch, one jaw, F, being made on the wheel, or so connected with it as to revolve with it.

The other jaw, G, is fitted to the square axle B, so as to slide easily a short distance, and thus become engaged with the revolving portion F, or disengaged. This is accomplished by connecting it with the lever E, by a short pin or arm H, below the point I, at which the lever E is hinged to the vertical portion of the arm D. By this pin and hinge, the lever E may be moved at right angles to the travel of the machine, and in so doing operate the clutch G, as desired.

One side of the curved arc J has the ordinary holding-teeth, or rack by which the lever E is kept at any part of the arc, while the other side has a lip, K, projecting upward from the periphery of the arc, as shown.

The lever E has a curved hook-like projection, L, on one side, which, when the lever is drawn to that side, will pass behind the lip K, and keep the lever closely to that side of the arc. This causes the two jaws of the clutch to engage, and as the wheel turns, it revolves the axle B, and its attached arms D D' will thus be thrown upward, carrying the frame and plows until they are clear of the ground.

During this movement, the lever E is travelling forward, and just at the point where the plows are sufficiently raised, the projection L is freed from the lip K, when a spiral, or other-shaped spring, M, acts on the lower end of the lever E, and forces the upper end to the opposite side of the arc, where it will be held by the rack. This motion also disengages the jaw F of the clutch, so that the jaw G is left free to turn with the bearing-wheel without further action on the frame.

The end of the arm D, which supports the axle $a$, has a longitudinal slot, within which the axle $a$ is allowed a certain motion up and down, the axle being adjusted to any point desired by set-screws $c\ c$. This raises and lowers one side of the frame A, for the purpose of adjusting or levelling it and the plows, as the depth is determined to be greater or less. This is also partially effected by making the furrow-wheel the largest.

Having thus described my invention,

What I claim as new, and desire to secure by Letters Patent, is—

1. In combination with the arms D D' and axes $a\ a'$, on the bar C, the clutch, consisting of the jaws F and G, on the wheel and axle, respectively, substantially as and for the purpose described.

2. The pin, or arm H, and the spring M, with the lever E, or equivalent device, for engaging and disengaging the clutch, substantially as described.

3. The rack J, constructed with the lip K, together with the holding-projection L, on the lever E, for retaining the jaws F and G in contact until the plows are raised, substantially as described.

4. The slotted arm D, with its set-screws $c\ c$, to raise and lower the axle $a$, and adjust the plows, substantially as and for the purpose herein described.

In witness whereof, I have hereunto set my hand and seal.

ARTEMAS DAVISON. [L. S.]

Witnesses:
GEO. H. STRONG,
J. L. BOONE.